United States Patent [19]

Llort et al.

[11] Patent Number: 4,984,803

[45] Date of Patent: Jan. 15, 1991

[54] GOLF BALL COVER COMPOSITION

[75] Inventors: Francisco M. Llort, Arlington, Tex.; Manuel R. Jerome, Jr., New Bedford, Mass.

[73] Assignee: Acushnet Company, New Bedford, Mass.

[21] Appl. No.: 419,646

[22] Filed: Oct. 11, 1989

[51] Int. Cl.$^5$ .............................................. A63B 37/12
[52] U.S. Cl. ........................ 273/235 R; 273/DIG. 10; 260/998.14; 524/908
[58] Field of Search ..................... 273/235 R; 524/908; 260/998.14; 525/236

[56] References Cited

U.S. PATENT DOCUMENTS

| | | | |
|---|---|---|---|
| 4,144,223 | 3/1979 | Kent | 525/186 |
| 4,192,141 | 12/1988 | Llort | 273/235 R |
| 4,853,557 | 10/1989 | Kajita et al. | 260/998.14 |

Primary Examiner—Allan M. Lieberman
Attorney, Agent, or Firm—Lucas & Just

[57] ABSTRACT

An improved golf ball cover is disclosed. The cover has balata replaced by cis 1,4 polybutadiene in an amount up to 30 parts without producing a deleterious effect on the cover yet maintaining the good "click" and "feel" of a balata covered golf ball and increasing the toughness of the ball cover.

7 Claims, No Drawings

GOLF BALL COVER COMPOSITION

This invention relates to golf balls and, more particularly, to balata covered golf balls where up to 30% of the balata used to form the cover has been replaced with cis 1,4 polybutadiene.

Typically, golf balls are made by forming a cover about a core. Cores are either wound or solid and generally measure about 1.4 to 1.6 inches (3.6 to 4.1 cm) in diameter. The cover is formed about the core to produce a golf ball having a diameter of about 1.68 inches, (4.27 cm) and weighing about 1.62 ounces (45.93 g). Both the weight and diameter are set by the United States Golf Association (USGA).

Generally, solid cores are made by mixing components such as polybutadiene with zinc diacrylate or zinc dimethacrylate and adding to this mixture a free radical initiator to cause cross-linking between the polybutadiene and the diacrylate/dimethacrylate. From this mixture solid, hard cores are molded.

Wound cores are typically made by winding a very long elastic thread about a center. The center is either a solid- or a liquid-filled balloon. The center typically measures about 1.0 to 1.3 inches (2.5 to 3.3 cm) in diameter and the thread is wound around the center to produce the finished core having a diameter of about 1.4 to 1.6 inches (3.6 to 4.1 cm).

Golf ball covers were made solely from balata, a common name for trans polyisoprene, until the 1960's when E. I. duPont de Nemours and Co. introduced SURLYN®, an ionic copolymer of methacrylic acid and ethylene. SURLYN has, for the most part, replaced balata because SURLYN covered balls have superior durability and because SURLYN is less expensive and more available than balata. Balata is more expensive than SURLYN because it is a specialty polymer which is produced in limited volume.

There are a number of golfers who prefer balata over SURLYN because of the better control afforded to them by the balata and because of the "click" and "feel" of the balata as compared to the SURLYN.

"Click" refers to the sound made when the club impacts upon the ball and "feel" is the overall sensation imparted to the golfer when the ball is hit. Although "click" and "feel" are not quantifiable, they are very real characteristics of any golf ball and some professional golfers prefer balata covered balls for these very reasons. Needless to say, balata is still used today as a cover material.

Another standard set for golf balls by the USGA besides size and weight is the initial velocity. Initial velocity has been set at a maximum of 250 feet (76.2 m) per second when measured on apparatus approved by the USGA. Golf ball manufacturers strive to come as close to this maximum as possible without exceeding it and any improvement which gets a ball closer to the "magic" 250 is looked at favorably.

It has now been discovered that cis 1,4 polybutadiene can be blended with balata to decrease the overall amount of balata used to form a cover without having a deleterious effect on the golf ball cover. In fact, the use of cis 1,4 polybutadiene with balata has been found to produce a number of advantages besides decreasing the amount of balata used. One of the main advantages is an increase in durability of the cover. Another advantage is that, even though the amount of balata in the cover is decreased, the "click" and "feel" has been found to be equivalent to a balata covered ball. Additionally, comparable, if not slightly increased, initial velocity has been noted in golf balls made in accordance with the present invention.

Preferably, cis 1,4 polybutadiene having a cis content of greater than 40% is used in forming golf ball covers in accordance with the present invention, and more preferred is cis 1,4 polybutadiene having a cis content of about 90% and above. Good results have been obtained with a polybutadiene having a cis content of about 96%. Cis 1,4 polybutadiene is commercially available.

It has been found that cis 1,4 polybutadiene may be incorporated into a cover of a golf ball to reduce the amount of balata used and that the addition of cis 1,4 polybutadiene has no apparent adverse effect on the other components used in forming a typical balata covered golf ball.

Generally, it has been found that a golf ball can be made in accordance with the present invention from a core and a cover wherein the cover is formed from a composition comprising about 95 to about 70 parts by weight, based on 100 parts by weight rubber in the composition (phr) of balata and about 5 to about 30 phr of cis 1,4 polybutadiene. More preferred is a golf ball made from a core and a cover wherein the cover is formed from a composition comprising about 95 to about 80 phr of balata and about 5 to about 20 phr of cis 1,4 polybutadiene. Most preferred is a golf ball comprising a core and a cover wherein the cover is formed from a composition comprising about 92 to about 90 phr of balata and about 8 to about 10 phr of cis 1,4 polybutadiene.

A preferred embodiment of the present invention is a golf ball comprising a core and a cover wherein the cover is formed from a composition comprising about 95 to about 70 phr of balata; about 5 to about 30 phr of cis 1,4 polybutadiene; up to about 30 phr of an inorganic filler; and up to about 2 phr of sulfur. Additional materials which may be included in the golf ball cover include other rubber like polymers besides balata and cis 1,4 polybutadiene, dyes, U.V. light absorbers, as well as other known additives. Typically, an accelerator is added to the composition to aid in curing.

The sulfur is used as a vulcanizing agent and the inorganic filler is used to add weight to the golf ball. Typical inorganic fillers are titanium dioxide, barium sulfate and zinc oxide. Polymers, in addition to balata and cis 1,4 polybutadiene that can be included in the composition, include polyurethane, SURLYN®, polystyrene and natural rubber. Preferably, only balata and cis 1,4 polybutadiene are used with no additional polymers. When these other polymers are added to the composition, the amount added should not be so much as to adversely affect the flow properties of the composition.

Using more than about 30 phr of cis 1,4 polybutadiene has been found to produce deleterious effects. Lower amounts, such as about 3 or 4 phr, can be used without having any noticeable effect on the cover.

The term "phr" as used in the specification and claims herein means parts by weight based on 100 parts by weight rubber in the composition used to form the cover. The phrase "rubber" refers to all polymers, e.g. balata, polyoctenylene rubber, natural rubber, polystyrene, polybutadiene, polyurethane and SURLYN®, that are added to the composition used to form the cover.

In order to make a golf ball with a cover formed from a composition made in accordance with this invention, conventional mixing and molding procedures for making a balata covered golf ball are used. Generally, the components of the composition are mixed together in a mill such as a two roll mill. The blended composition is then formed into slabs. The blended composition is maintained in a slab state until such time as golf balls are ready to be molded. When the balls are ready to be molded, strips are cut from the slab and cups or half shells of the blended composition are formed about the cores. The core may be either solid or wound. Wound cores are preferred in this invention. Such molding procedures for forming the blended composition around a golf ball core are well known to those of skill in the art and vary slightly from manufacturer to manufacturer.

These and other aspects of the present invention may be more fully understood with respect to the following examples.

EXAMPLE 1

This example illustrates making one dozen golf balls with the composition of the present invention. One dozen conventional balata covered balls were made for purposes of comparison. Each set of twelve balls was made by molding the compositions as listed in Table I below about wound cores.

TABLE I

| Component | Present Invention (phr) | Control (phr) |
| --- | --- | --- |
| Balata | 92 | 100 |
| Cis 1,4 polybutadiene | 8 | — |
| TiO$_2$ | 16.1 | 16.1 |
| ZnO | 13.3 | 13.3 |
| Sulfur | 1.31 | 1.31 |
| Stearic Acid | 0.25 | 0.25 |
| Thiotax | 0.06 | 0.06 |
| Blue Color | 0.016 | 0.016 |

The cis 1,4 polybutadiene had a cis content of 96% and was obtained from Shell under the trade name Cariflex BR-1220.

Thiotax is 2-mercaptobenzothiazole.

The wound cores had a frozen liquid center upon which elastic thread had been wound to produce a finished core size of about 1.61 inches (4.09 cm). Around these cores the compositions of Table I above were molded in a conventional manner to form a cover and produce finished dimpled golf balls of about 1.68 inches (4.27 cm) in diameter. These balls had 384 dimples distributed uniformly about the cover.

EXAMPLE 2

All of the golf balls of Example 1 were tested by live golfers by hitting the balls of Example 1 with a club having a box groove. It was found that the golf balls of the present invention were more durable than the golf balls having a cover made only from balata.

Durability is typically measured by both cut resistance and shear resistance. Shear resistance is the ability of the cover to withstand the punishment provided to the cover every time the ball is squarely hit. Cut resistance is the ability of the ball to withstand the punishment provided to the cover every time 8d the ball is mis-hit.

After repeated hits with the club, the golf balls were inspected for shear damage. Shear was defined as crimping of the surface and in a few cases actual lifting of portions of the cover.

Only two of the golf balls made in accordance with the present invention had shear damage, while 10 of the control balls had shear damage. This ranking of balls was done by experienced golfers. They did not know which twelve balls were the balls made in accordance with the present invention and which twelve balls were the control balls.

This example illustrates the improved durability of a golf ball made in accordance with the present invention.

EXAMPLE 3

In order to determine the "click" and "feel" of a golf ball made in accordance with the present invention, live golfers hit the golf balls of Example 1. Each player hit both the control and the ball of the present invention. Interviews of the golfers after hitting the balls confirmed that the "click" and "feel" of the invention ball was comparable to conventional balata balls.

Such results are indeed surprising and unexpected. This means that a ball having less balata in the cover stock can be made which will satisfy the golfer's want for a ball with the "click" and "feel" of a conventional balata ball while providing improved shear resistance as shown in Example 2 above.

It will be understood that any numerical term appearing in the claims that is a number and is not modified by the term "about" is to be interpreted as if the term "about" did in fact appear in the claims to modify that number.

It will be understood that the claims are intended to cover all changes and modifications of the preferred embodiments of the invention herein chosen for the purpose of illustration which do not constitute a departure from the spirit and scope of the invention.

What is claimed is:

1. A golf ball comprising a core and a cover wherein the cover is formed from a composition comprising about 70 to about 95 phr of balata and about 5 to about 30 phr of cis 1,4 polybutadiene having a cis 1,4 content of greater than 40%.

2. The golf ball of claim 1 wherein the cis 1,4 polybutadiene is present in an amount from about 5 to about 20 phr.

3. The golf ball of claim 1 wherein the cis 1,4 polybutadiene is present in an amount from 8 to about 10 phr.

4. The golf ball of claim 3 wherein the cis 1,4 polybutadiene has a cis content of 90% or greater.

5. In a golf ball comprising a core and a cover, wherein the cover is formed from a composition comprising balata, an improved cover, said improved cover formed from a composition comprising about 55 to about 70 phr of balata; about 5 to about 30 phr of cis 1,4 polybutadiene having a cis 1,4 content of greater than 40%; up to about 30 phr of an inorganic filler; and up to about 2 phr of sulfur.

6. The golf ball of claim 5 wherein the cover is further comprised of one or more additives selected from the group consisting of dyes and U.V. light absorbers.

7. The golf ball of claim 5 wherein the cis 1,4 polybutadiene has a cis content of 90% or greater.

* * * * *